3,235,450
METHOD OF CONTROLLING NEMATODES
Jerold W. Bushong, Gasport, N.Y., assignor to FMC Corporation, New York, N.Y., a corporation of Delaware
No Drawing. Filed Aug. 26, 1963, Ser. No. 304,690
5 Claims. (Cl. 167—33)

This invention relates to a novel method for the control of nematodes, particularly for control of *Meloidogyne incognita*, commonly called the root-knot nematode, as well as other parasitic worm life which exist in the soil at some stage of their life cycles, for example as eggs, larvae or adults. The control of nematodes herein is obtained without demonstrable injury to plants growing in the treated soil, by treating the soil with the chemical compound O,O-diethyl O-(2-keto-2H-1-benzopyran-3-yl) phosphorothioate, having the structural formula:

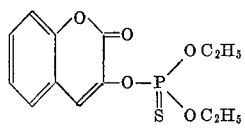

This compound may be prepared by the reaction of an O,O-diethyl phosphorohalidothioate, of the formula:

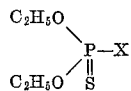

wherein X is halogen, preferably chlorine or bromine, with 3-hydroxycoumarin in the presence of an acid acceptor such as potassium carbonate, triethylamine, lutidine, pyridine, dimethylaniline, and the like. The reaction is readily carried out in the presence of a catalyst, such as finely divided copper, carbon tetrachloride, carbon tetrabromine, and other oxidizing catalysts. A solvent is normally present, such as low molecular weight ketones, benzene, or carbon tetrahalide. The reaction occurs within the range of 10°–100° C. depending on the reactants and conditions. The preparation is illustrated in the following specific example:

*Example 1.—O,O-diethyl O-(2-keto-2H-1-benzopyran-3-yl) phosphorothionate*

Sixteen and two tenths grams 3-hydroxycoumarin, 20.0 g. anhydrous potassium carbonate, and 0.5 g. freshly prepared copper powder were added to 340 ml. methyl ethyl ketone and refluxed with stirring for one hour. To this was added 20.0 g. O,O-diethyl phosphorochloridothioate over one half hour, and the mixture was refluxed during and additional 3 hours. The reaction mixture was then filtered, and the solvent removed by distillation. The residue was dissolved in 100 ml. benzene, washed twice with 100 ml. of 5% aqueous sodium carbonate, then with 10 ml. of water, and dried over anhydrous sodium sulfate. The benzene was removed, to leave an oil which crystallized from alcohol, to yield O,O-diethyl O-(2-keto-2H-1-benzopyran-3-yl) phosphorothioate having a melting point of 61–63° C.

The material, like most agricultural chemicals, is not usually applied full strength. It is generally incorporated with the adjuvants and carriers normally employed for facilitating dispersion of active ingredients for agricultural chemical applications, recognizing the accepted fact that the formulation and mode of application may affect the activity of the material. The toxicant of this invention may be applied as a spray, dust or granule. It may be formulated as granules of large particle size, as powdery dusts, as wettable powders, as emulsifiable concentrates, or as solutions. More preferably, it is applied dispersed on granular carriers, or as wettable powder.

In granular formulations, for example, the toxicant is spread on the surface of, or absorbed in, a granular carrier which may be inert or may be a fertilizer material. A typical granular formula is as follows: 4.0% of the chemical O,O-diethyl O-(2-keto-2H-1-benzopyran-3-yl) phosphorothioate, and 96.0% attapulgite (Attaclay 24/48 mesh).

Wettable powders are in the form of finely divided particles which disperse readily in water or other dispersant, normally due to the presence of a dispersing agent. The powder may be applied to the soil either as a dry dust or preferably as an emulsion in water. Typical carriers include fuller's earth, kaolins, silicas and other highly absorbent organic diluents. Typical wetting, dispersing or emulsifying agents used in agricultural formulations include, for example, the alkyl and alkylaryl sulfonates and sulfates and their sodium salts, alkylamide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the nematocidal composition. A typical formulation for use herein is as follows: 50% O,O-diethyl O-(2-keto-2H-1-benzopyran-3-yl) phosphorothioate, 48.0% kaolin (Barden clay), 1.0% sodium lignosulfonate (Marasperse N) and 1.0% sodium lauryl-sulfonate (Maprofix $N_{eu}$ powder).

The active ingredient, when mixed with a finely ground solid such as talc, may be applied as a dust; or it may be combined with a solvent and a wetting agent in the form of an emulsifiable concentrate which is then diluted further with water for application to the soil. All of these techniques for formulating and applying active ingredients to the soil are well known in the art.

The following examples further illustrate the invention, but are not to be construed as limiting the same.

*Example 2.—Nematode control*

The compound O,O-diethyl O-(2-keto-2H-1-benzopyran-3-yl) phosphorothioate, formulated as a 5% dust on attapulgite clay, was blended with soil in various concentrations, as shown in Table 1 below. The inoculum was then blended with the soil and the formulated compound, in aliquot portions, the inoculum having been prepared by cutting up the roots of nematode (*Meloidogyne incognita* var. *acrita*) infested tomato plants into pieces 2–5 mm. in length and mixing these roots with sand in the ratio of 20 parts sand to one part inoculum. The blended mixture, containing the desired concentration of chemical and infestation, was placed in test containers in the greenhouse, and a young tomato plant was planted in each container. After five weeks, the tomato plant roots were washed free of soil and examined for infestation. Results at various concentrations of active ingredient, and an untreated check, were recorded as follows:

TABLE 1.—CONTROL OF ROOT-KNOT NEMATODE ON TOMATOES

| Concentration of active ingredient (p.p.m. in soil): | Degree of infestation* |
|---|---|
| 50 | (0) None. |
| 25 | (0) None. |
| 20 | (0) None. |
| 15 | (0) None. |
| 10 | (0) None. |
| 5 | (−1) Less than 10%. |
| Untreated | (4) Very severe. |

*Root-knot index: 0=no infestation; 1=slight infestation, 2=moderate infestation, 3=heavy infestation, 4=very severe infestation.

The nematocidal compound with which the present invention is concerned must be used in effective amount. As noted above, it may be effectively applied to soils in various ways such as a dust for application with a conventional duster, as an emulsion for application with sprayers, on granules for application with a conventional fertilizer spreader, or adsorbed on activated carbon for application to seeds. Whatever the method of application, the compound is effectively applied at concentrations varying from 2 to 50 pounds per acre.

It is apparent that the specific formulations and examples illustrated are by way of example only and are by no means exhaustive of all nematode or crop species or all conditions. They serve merely to illustrate the value of the method of controlling nematodes by applying an effective amount of O,O-diethyl O-(2-keto-2H-1-benzopyran-3-yl) phosphorothioate. Modifications may be made in the details of this method, without departing from the novel concept herein, as defined in the following claims.

I claim:
1. A method of controlling nematodes in the soil which comprises applying thereto a nematocidal amount of the compound O,O-diethyl O-(2-keto-2H-1-benzopyran-3-yl) phosphorothioate, of the formula:

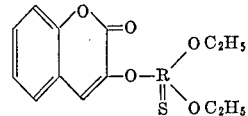

2. A method of controlling nematodes in the soil which comprises applying to infested soil a nematocidal amount of an aqueous emulsion of the compound O,O-diethyl O-(2-keto-2H-1-benzopyran-3-yl) phosphorothioate.

3. Nematocidal composition comprising an inert carrier, a surface active agent, and the compound O,O-diethyl O-(2-keto-2H-1-benzopyran-3-yl) phosphorothioate.

4. Nematocidal composition according to claim 3 in which the compound O,O-diethyl O-(2-keto-2H-1-benzopyran-3-yl) phosphorothioate is suspended in water as an inert carrier.

5. Nematocidal composition according to claim 3 in which the compound O,O-diethyl O-(2-keto-2H-1-benzopyran-3-yl) phosphorothioate is admixed with an inert granular carrier.

No references cited.

JULIAN S. LEVITT, *Primary Examiner.*